No. 620,170. Patented Feb. 28, 1899.
W. J. PEPPARD.
BALE TIE.
(Application filed Feb. 12, 1898.)

(No Model.)

Witnesses
Clarence N. Walker.
Harry L. Amer.

Inventor
William J. Peppard.
by O. S. Shockbridge
his Attorney.

THE NORRIS PETERS CO., PHOTO-LITHO., WASHINGTON, D. C.

United States Patent Office.

WILLIAM J. PEPPARD, OF PERCY, MISSISSIPPI.

BALE-TIE.

SPECIFICATION forming part of Letters Patent No. 620,170, dated February 28, 1899.

Application filed February 12, 1898. Serial No. 670,090. (No model.)

*To all whom it may concern:*

Be it known that I, WILLIAM J. PEPPARD, a citizen of the United States, residing at Percy, in the county of Washington and State of Mississippi, have invented certain new and useful Improvements in Bail-Ties; and I do hereby declare the following to be a full, clear, and exact description of the invention, such as will enable others skilled in the art to which it appertains to make and use the same.

My invention relates to a novel bale-tie, and has for its object the production of a simple, durable, and efficient device of this character which may be readily applied to a bale and which when so applied will be securely held in place by a locking-plate of ingenious and novel construction, which will tend to hold the ends of the tie with additional security as the strain is increased by the expanding of the bale after it leaves the compress.

To this end the invention consists in providing a locking-plate, preferably of metal, with a small aperture near one end to which one extremity of the tie is looped, with a triangular aperture at its center through which the opposite end of the tie is designed to be passed from the under side, and with an inclined open-ended slot near the opposite end through which the free extremity of the tie is designed to be passed in order that the locking-plate may bear upon the said extremity and securely retain the ends of the tie when the bale has been compressed.

Figure 1:
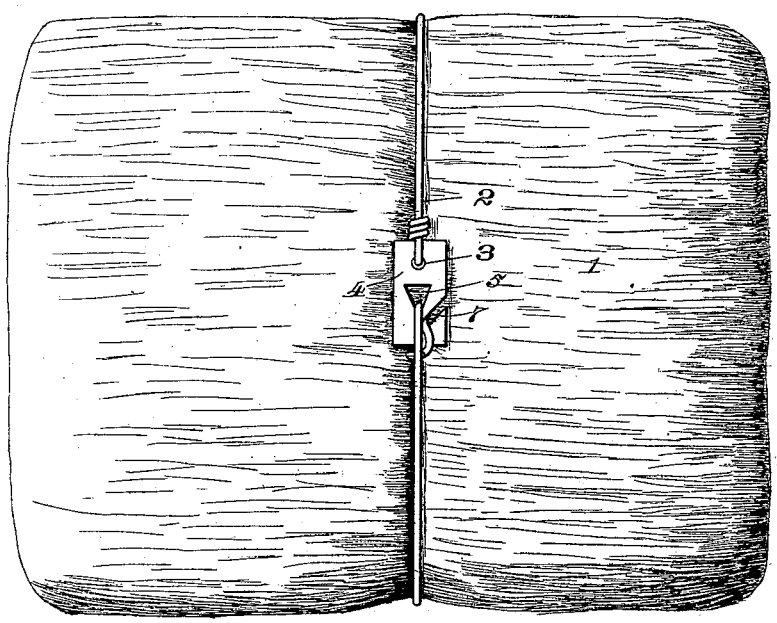
Figure 2:
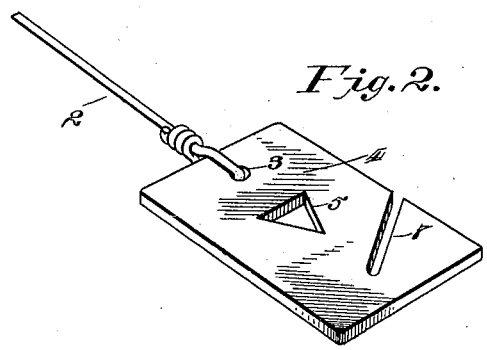

Referring to the drawings, Figure 1 is a top plan view of a bale provided with my tie. Fig. 2 is a perspective view of the tie detached.

Referring to the numerals on the drawings, 1 indicates a bale, and 2 a bale-tie, of wire or other suitable material, passed around the bale and having one end passed through an aperture 3, adjacent to one extremity of the locking-plate 4 and secured as by looping it upon itself and winding the extremity of the wire around the tie in the manner illustrated.

5 indicates a triangular opening at the center of the plate 4, having one of its sides parallel with the end of the plate to which the extremity of the bale is permanently secured, this disposition of the triangular aperture serving to bring one of its angles at the center of the plate and directed toward its opposite end.

7 indicates an inclined slot or recess extending from one side of the locking-plate to about its middle and slightly in advance of the triangular opening.

In use the locking-plate is placed upon the top of the bale and the tie is passed around the latter. The free extremity of the tie is then passed under the plate and up through the triangular opening. The tie is now drawn taut, and as soon as it is as tight as it can be made by the hand its free extremity is passed under the angular portion of the plate in front of the angular slot by passing said extremity through the slot and, if desired, crossing the strands, as shown. The purpose of the triangular opening is for producing a maximum resistance to the movement of the locking-plate upon the bale, as it will be obvious that the cotton will expand upwardly into the opening and the angular sides thereof will tend to prevent twisting or movement of the plate in any direction. Furthermore, the drawing down of the tie into the angle of the aperture 5 serves to bind the same and hold it securely, and the inclination of the slot 7 facilitates the wrenching of the tie under the end of the plate to effect its locking. After the band or tie 2 has been drawn taut in the slot 5 it binds firmly in the angle of the slot 5 which is farthest from the aperture 3. While the band or tie is thus held frictionally, the end of the tie or band is inserted through the open end of the slot 7 and moved inwardly toward the inner end of said oblique slot 7. Owing to the obliquity of the slot, as the end of the band is drawn toward the inner end of the slot there is no tendency for the band to slip through the triangular slot 5 and allow the slackening of the band. Furthermore, the end of the tie or band is frictionally held between the plate and the bale, and the extreme end of the band may be tucked under the band itself, as shown in Fig. 1, thereby obviating any possibility of the band getting loose.

Thus it will be seen that I have produced a simple and inexpensive bale-tie which may be readily applied to the bale and which when so applied will be held securely; but while the present embodiment of my invention appears at this time to be preferable I do not desire to limit myself to the structural details illustrated and described, but reserve the right to change, modify, and vary such details within the scope of my invention.

Having thus described my invention, what I claim as new is—

In a bale-tie, the combination with a flexible piece or band for encircling the bale, of an oblong plate comprising three openings, one opening at one end of the plate to receive permanently one end of the band, an oblique open slot at the opposite end of the plate terminating at its inner closed end near the longitudinal center of the plate, and a triangular opening located between the aforesaid openings with its binding-angle pointing toward the closed end of the oblique slot, the oblique slot extending from its open end toward the opposite end of the plate from that in which the first-named opening is formed substantially as described.

In testimony whereof I affix my signature in presence of two witnesses.

WILLIAM J. PEPPARD.

Witnesses:
JAMES H. WILLIS,
E. W. FLOYD.